United States Patent [19]
Gomez

[11] 3,921,287
[45] Nov. 25, 1975

[54] FRUIT PEELER

[76] Inventor: Gerardo Gomez, 1113 Birch St., Boonton, N.J. 07005

[22] Filed: July 19, 1974

[21] Appl. No.: 489,923

[52] U.S. Cl. .................. 30/280; 30/123.5; 30/282; 30/285
[51] Int. Cl.² ...................... B26B 3/00; B26B 29/00
[58] Field of Search ............ 30/278, 280, 282, 285, 30/123.5

[56] References Cited
UNITED STATES PATENTS

| | | | |
|---|---|---|---|
| 540,667 | 6/1895 | Hunt et al. | 30/280 X |
| 868,151 | 10/1907 | Arnold | 30/280 X |
| 1,041,049 | 10/1912 | Elliott | 30/280 |
| 1,533,445 | 4/1925 | Moller | 30/280 X |
| 2,031,472 | 2/1936 | Errig et al. | 30/280 X |
| 2,230,042 | 1/1941 | Mertens | 30/280 |

Primary Examiner—James L. Jones, Jr.
Assistant Examiner—J. T. Zatarga
Attorney, Agent, or Firm—David Fink

[57] ABSTRACT

A fruit peeler device for cutting off a portion of a fruit peel features a handle for holding the device, two rollers connected to the handle and arranged spaced apart to define a substantially flat working surface for moving the device in contact with the fruit peel during the cutting thereof, and cutting means disposed between the rollers for cutting off the portion of the fruit peel, the cutting means featuring a cutting edge projecting across the working surface and convexed thereto, whereby movement of the device in contact with the fruit peel results in the cutting edge cutting off a portion of a fruit peel.

3 Claims, 4 Drawing Figures

FRUIT PEELER

Background of the Invention

The invention relates to a fruit peeler and more particularly to a lemon peeler for peeling a continuous strip of lemon suitable for use in the preparation of alcoholic beverages and alike.

Prior art fruit peelers have been directed to the simple problem of removing the peel from a fruit and require considerable skill and care in order to obtain a continuous peel strip.

Summary of the Invention

One of the principal objects of the invention is a fruit peeler suitable for providing a continuous fruit peel cutting.

Another object of the present invention is to provide a fruit peeler which is simple to operate and suitable for peeling a variety of fruits.

Another object of the present invention is to provide a fruit peeler which is economical to manufacture.

Further objects and advantages of the invention will be set forth part in the following specification and in part will be obvious therefrom without being specifically referred to, the same being realized and attained as pointed out in the claims hereof.

Other objects of the invention will in part be obvious and will in part appear hereinafter.

The invention accordingly comprises the features of construction, combination of elements and arrangement of parts which will be exemplified in a construction hereinafter set forth and the scope of the application of which will be indicated in the claims.

Brief Description of the Drawings

For a fuller understanding of the nature and objects of the invention, reference should be had to the following detailed description, taken in connection with the accompanying drawings, in which.

Description of the Preferred Embodiment

One of the embodiments has been selected for illustration in the accompanying drawings and for description in the specification.

Figure 1:
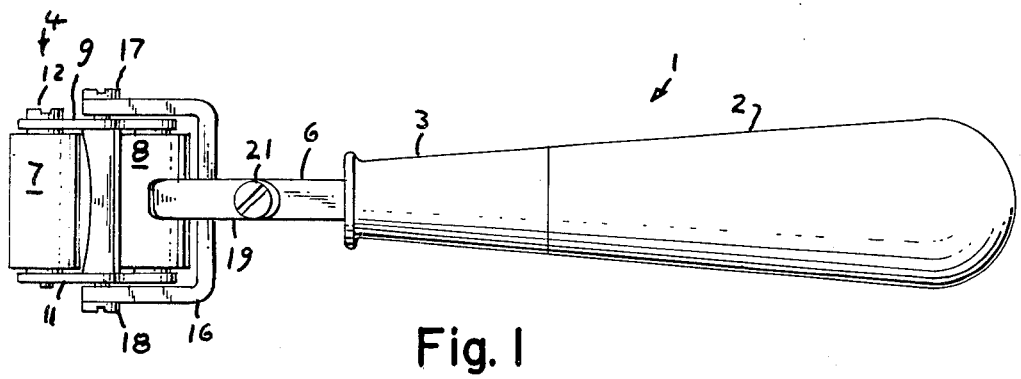
FIG. 1 is a plan view of the present invention.
Figure 2:
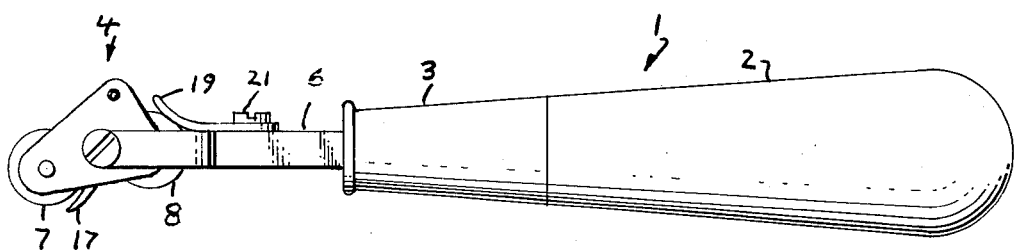
FIG. 2 is a side elevational view of the present invention.
Figure 3:
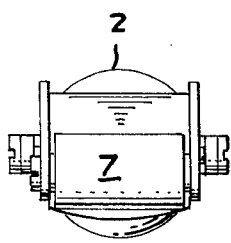
FIG. 3 is an end elevational view of the present invention.

Reference is had to FIGS. 1 to 3. Fruit peeler 1 includes an elongated handle 2 composed of wood or plastic or some other convenient material is preferably of a size suitable for use by an adult. The handle 2 is integrally attached to a metal sleeve 3 to which is attached the cutting head 4 by support 6.

Figure 4:
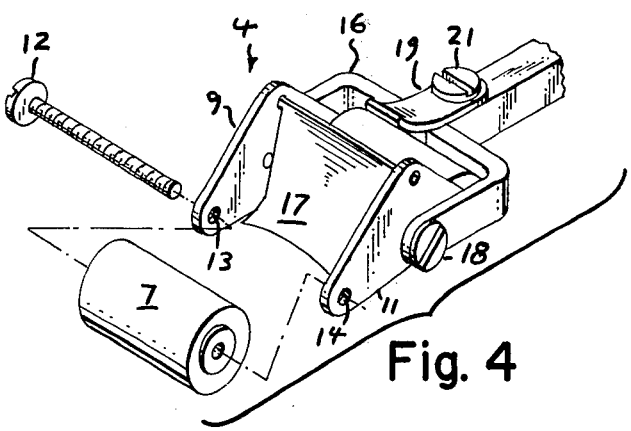
FIG. 4 is an exploded perspective view of a portion of the present invention.

The details of the cutting head 4 can be seen in the exploded perspective view in FIG. 4. First and second roller means such as rollers 7 and 8 are positioned spaced apart and with parallel axes in order to define a plane surface. The roller 7 is fixed between side plates 9 and 11 by bolt 12 which passes through apparture 13 and engages threaded apparture 14. Similarly roller 8 is fixed between the plate 9 and 11. The screw supporting the roller 8 is not shown and it is noted that the roller 8 is fixed between plates 9 and 11 so that there is clearance between the plates 9 and 11 and the U-shaped support 16.

Cutting means such as cutting blade 17 is fixed between the plates 9 and 10. The cutting blade 17 projects below the working surface defined by the rollers 7 and 8 and is inclined thereto. It is of considerable importance that the cutting blade 17 is curved or convexed with respect to the working surface in order to obtain the desired continuous peel length.

The cutting head including the rollers 7 and 8, sideplates 9 and 11, and cutting blade 17 forms an intergral assembly and is rotatably connected to the support 16 by bolt 17 which is connected to nut 18. The rotatable feature of the cutting head 4 simplifies the use of the device 1 because the cutting head 4 can readily change its position with respect to the handle 2 in order to follow the contour of a fruit surface. Limit means such as metal tab 19 is attached to the support 6 by bolt 21 in order to prevent the cutting head from rotating into an unusable position so that the device 1 is convenient to use in practice.

Generally, the various parts in the cutting head 4 should be of a material resistant to rust and acid attack in order to provide a long useful life to the cutting head 4.

The operation of the above described device 1 is clear from the arrangement of the various parts. The cutting head 4 is contacted with surface of a fruit so that the rollers 7 and 8 contact the surface of the fruit and cutting blade 17 can cut into the surface of the fruit. The device 1 is then moved so that cutting blade 17 can cut the surface of the fruit in order to cut off a continuous peel.

I wish it to be understood that I do not desire to be limited to exact details of construction shown and described, for obvious modifications will occur to a person skilled in the art.

Having described the invention, what I claim as new and desire to secure by Letters Patent, is as follows:

1. A fruit peeler device, for cutting off a portion of a fruit peel, comprising, in combination:

a handle for holding said device;

U-shaped support means including two elongated members and a cross member therebetween connected to said handle;

front and rear roller means each having an axis substantially parallel to the other and disposed spaced apart to define a substantially flat working surface for moving said device in contact with said fruit peel during the cutting thereof;

cutting means disposed between said front and said rear roller means and operative for cutting off said portion of said fruit peel, said cutting means comprising a cutting edge portion projecting obliquely across said working surface and having at least a central part curved away from said front roller means; and connection means operative to connect said front and said rear roller means and said cutting means together to form a unit rotatably connected to said elongated members for rotation about an axis substantially parallel to the axes of said roller means, whereby movement of said device with said front and said rear roller means contacting said fruit peel results in said cutting edge cutting off said portion of said fruit peel.

2. The fruit peeler as claimed in claim 1, further comprising limit means operative to limit the angular range of rotation of said unit to a predetermined range suitable for the use of said device.

3. The fruit peeler as claimed in claim 1, wherein said connection means includes release means operative for removing said front roller means, whereby said front roller means can be removed to permit sharpening of said cutting edge.

* * * * *